United States Patent

[11] 3,614,605

[72] Inventor Charles W. Eisele
 Warminister, Pa.
[21] Appl. No. 852,262
[22] Filed Aug. 22, 1969
[45] Patented Oct. 19, 1971
[73] Assignee H. C. Price Co.
 Bartlesville, Okla.

[54] HOLIDAY DETECTOR UTILIZING STAGGERED CAPACITOR DISCHARGES FOR PRODUCING A FAST RISE TIME HIGH-VOLTAGE PULSE
17 Claims, 2 Drawing Figs.

[52] U.S. Cl. .................................................. 324/54,
 307/108, 315/244, 320/1, 328/67
[51] Int. Cl. .................................................. G01r 31/12
[50] Field of Search .................................... 324/54, 55;
 321/15; 307/108, 268; 328/66, 67; 320/1;
 315/241, 244; 219/112, 113

[56] References Cited
UNITED STATES PATENTS
| | | | |
|---|---|---|---|
| 2,249,157 | 7/1941 | Morgan et al. | 324/55 |
| 2,278,481 | 4/1942 | Peters et al. | 321/15 X |
| 2,304,513 | 12/1942 | Stearns | 324/54 |
| 3,259,893 | 7/1966 | Parker | 324/54 X |
| 3,327,199 | 6/1967 | Gardner et al. | 321/15 X |
| 3,339,136 | 8/1967 | Rasor et al. | 324/54 |
| 3,354,387 | 11/1967 | Whaley et al. | 324/55 |
| 3,510,763 | 5/1970 | Clinton | 324/54 |

Primary Examiner—Gerard R. Strecker
Attorney—Don M. Bradley

ABSTRACT: An electrical detector operable to detect holidays or defects in insulating coatings or mastic coatings generally applied to pipelines has a portable DC power supply, a DC to DC converter, an energy storing means operable to store energy from the DC converter, and SCR interconnected with the energy storing means, an oscillator means for gating the SCR on to discharge the energy storing means through a double primary pulse transformer to produce a high voltage, fast time pulse on an exploring electrode, and an alarm circuit capable of audibly and/or visually indicating that a high voltage has arced through the pipeline coating at a holiday point.

HOLIDAY DETECTOR UTILIZING STAGGERED CAPACITOR DISCHARGES FOR PRODUCING A FAST RISE TIME HIGH-VOLTAGE PULSE

BACKGROUND AND BRIEF DESCRIPTION OF THE INVENTION

The problem and desirability of testing insulating coatings and pipeline mastic coatings of various types have been clearly set forth in the two Stearns U.S. Pat. Nos. 2,304,513 and 2,436,615; and in the patent to Rasor et al. No. 3,339,136. My invention relates generally to the unique and completely electronic circuitry of the holiday detector described briefly above and to the successful elimination of heretofore essential electromechanical components.

A portable battery supplies electrical energy for my detector which utilizes a converter to step up the battery voltage to a usable value for charging two storage capacitors. A unijunction oscillator with a pulse shaping circuit associated therewith controls the switching or gating on of either one (preferred) to two SCR's to discharge the two capacitors individually through a different winding of a double primary pulse transformer in order to increase the voltage of the output pulse on an interconnected exploring electrode. A warning circuit warns of the presence of the detected holiday.

An object of my invention is to provide a holiday detector having uniquely constructed circuitry arranged to substantially increase the efficiency and sensitivity of same.

Another object of my invention is to provide in a holiday detector SCR, character described circuitry that is to to decrease the cost of certain specified components thereby decreasing the overall cost of the entire unit. It is a feature of this object that the converter circuitry permits less expensive transistors to be used therein, transistor the housing of oscillator and act as conduction, the unit heat sink, and reduces possible shock hazards.

A further object of my invention is to provide a holiday detector that dissipates voltage transients in a unique manner without the need of conventional protective components such as Zener diodes.

Another object of my invention is to provide a holiday detector of increased sensitivity. An important feature of this object resides in the utilization of a unijunction oscillator, a circuit means for shaping the output pulses emanating from the oscillator and in applying the shaped pulse with a fast rise time to a circuit means for discharging this energy storing means into a unique pulse producing means for the exploring electrode of the holiday detector.

Another object of my invention is to provide holiday detector circuitry of the character described that includes novel means for controlling the on and off condition of the circuit means that permits discharging of the energy storing means. It is a feature of this object that the discharging means includes an SCR with unique circuitry to protect the SCR from being inadvertently gated on by voltage transients or the like.

A further object of my invention is to provide holiday detector circuitry capable of producing high-voltage output pulses in the range of from 10 kv to 75 kv using exclusively electronic components. A very important feature of this object resides in the unique construction and use of a double primary pulsing transformer.

Another object of my invention is to provide a holiday detector that is capable of moving at a faster rate over the surface of pipeline coating material and which individually indicates even closely located holidays as such rather than as a single one.

These and other objects will become apparent from the following description when taken in conjunction with the accompanying drawings in which:

FIG. 1 is a block diagram showing the essential functional components of my invention; and FIG. 2 is a schematic circuit diagram illustrating one embodiment of my holiday detector circuitry.

DETAILED DESCRIPTION OF THE INVENTION

Figure 1:
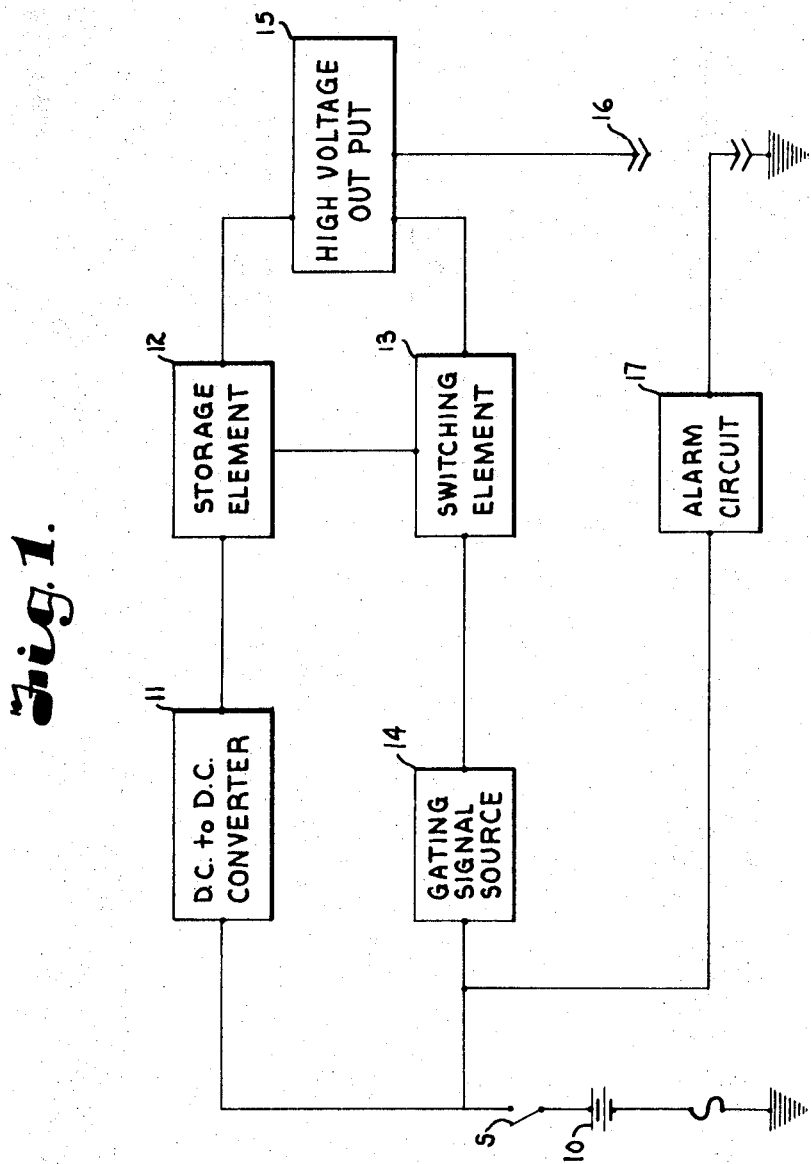

Turning now more specifically to the circuit configuration embodied in my holiday detector, FIG. 1 depicts the functional elements comprised within the same. This circuit discloses the unique components in their operative environment and includes a source of DC potential (battery 10), a DC to DC converter 11 which operates to change the battery voltage to a higher level for storage purposes, a storage element 12 (two capacitors discussed in more detail, infra), a switching element (a silicon control rectifier) 13, a circuit for producing a signal capable of gating the switching element 13 on and off, a high-voltage output 15, and an exploring electrode 16 with an associated alarm circuit 17 capable of indicating the presence of a holiday to the operator.

As mentioned above, the battery 10 supplies a source of electrical energy to the detector and as such is easily portable or movable as a unit. Converter 11 steps the battery voltage up to a usable value for charging the storage element 12. A later discussed unijunction transistor oscillator briefly described above as the gating signal source 14 controls the condition of switching element 13 so that storage element 12 may be discharged in accordance with the frequency of the signal emanating from the oscillator. Each time switching element 13 is gated on, the storage element 12 is discharged into a high-voltage output 15 thereby placing an extremely high voltage output pulse on exploring electrode 16. If a holiday exists, alarm circuit 17 picks up the presence of the same and signals the operator in time to accurately determine the location of the holiday.

DC TO DC CONVERTER

Figure 2:
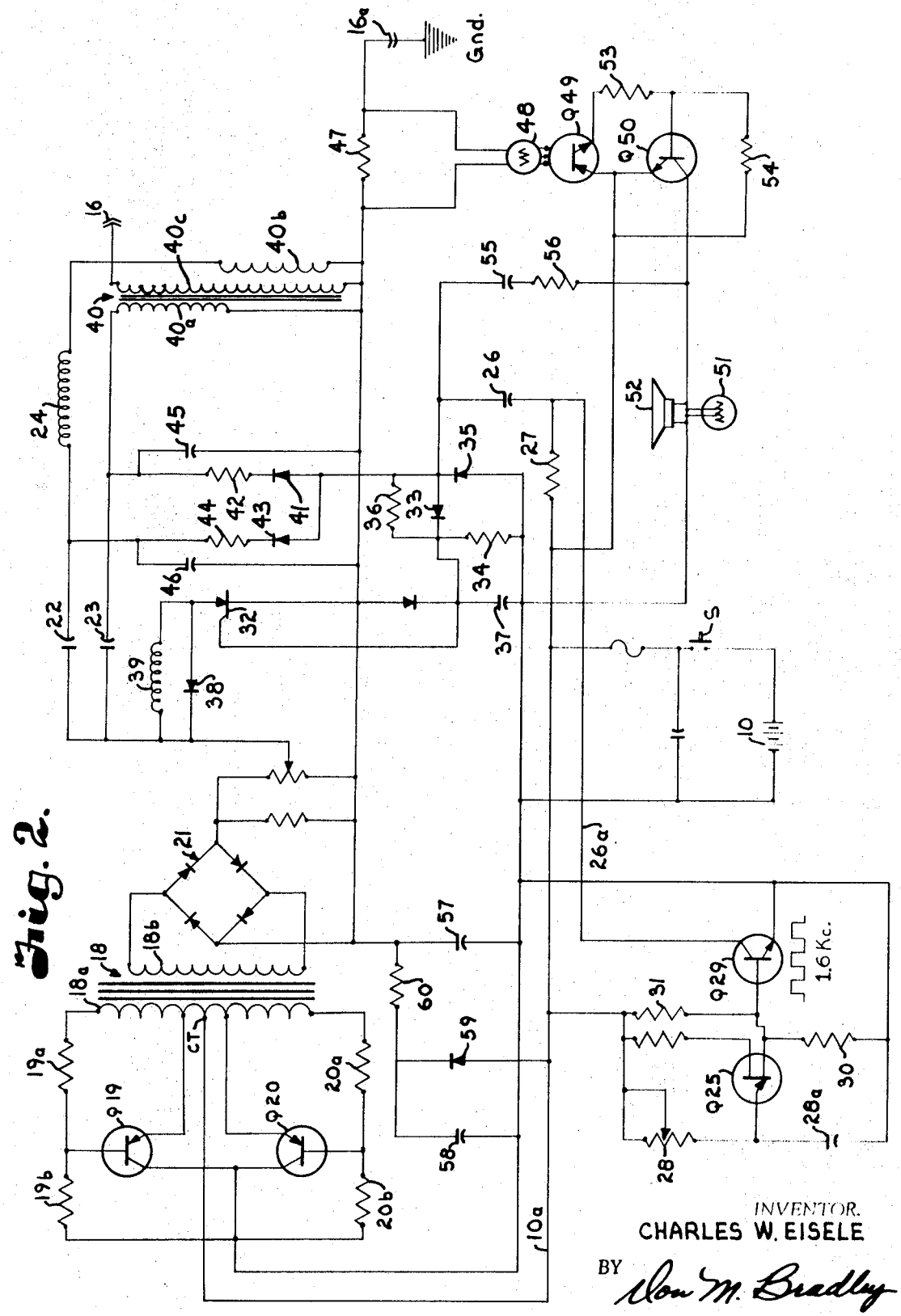

As shown in FIG. 2, battery 10 is connected via line 10a to the center top of the primary winding of a toroidal transformer 18. Located in the primary circuit of the DC converter are two PNP transistors Q19 and Q20 with their collectors connected in common. The base of each transistor is connected through a resistor to the feedback winding of the transformer. For example, the base of transistor Q20 is connected to the lower end of primary winding 18a through resistor 20a. Resistors 19b and 20b interconnect the bases of their respective transistors with the common collector circuit.

The converter operates to "convert" the nominal 10 volt battery supply to approximately 1200 volts DC in the following manner. The closing of an associated switch S energizes the subject device and applies the 10 volt battery potential to center tap CT of primary winding 18a. Current flow through winding 18a to the voltage dividing networks 19a, 19b and 20a, 20b, tend to bias transistors Q19 and Q20 to the on condition. However, due to variations in the transformer, the resistive dividing networks, and especially in the current gain of the transistors, one transistor is favored over the other for a biased on condition. For example, assume that transistor Q19 is the favored transistor and that it is driven toward saturation. As the collector current thereon increases, the magnetizing current also increases. Once transistor Q19 saturates, the voltage across the upper half of primary winding 18a is equal to the input voltage less the saturation voltage of transistor Q19. As a practical convenience, the transformer windings are phased in such a way that the feedback windings provide an on bias for transistor Q19 as well as an off bias for the opposite transistor (Q20).

With a continued current in one direction in primary winding 18a, the core of transistor 18 will eventually reach a point at which its permeability begins to rapidly decrease. This core saturation reduces the inductive coupling between the windings and, at which time, the transistors begin to lose the base drive attained from the feedback winding. With a reduced feedback voltage, the on transistor (Q19) is pulled out of saturation and the off transistor (Q20) is biased toward the on condition starting the second half of the cycle. It is seen that with the above-mentioned collapsing field (or permeability) cutting across all of the transformer windings (18a and 18b), a voltage is developed in the transformer which is opposite in polarity to the voltage developed by the expanding field. Once started, the above-described action converts the 10 volt DC battery voltage into an AC signal having a frequency of 1600 Hz. This 1600 Hz. signal is applied to diode bridge 21 which rectifies same so that the output of the DC to DC converter has an effective 1200 volt DC potential.

It should be noted that the converter discussed immediately above has particular utility when used with my holiday detector. For example, the case of each transistor is, in effect, the collector thereby permitting the same to be mounted directly to the housing of the detector module. In this manner, relatively inexpensive transistors may be used as the entire housing serves as a heat sink to dissipate the transistor heat caused by the high emitter-to-collector current flow. Additionally, since the cases of the transistors are at an approximate ground potential, the shock hazards to maintenance and operator personnel are greatly reduced.

External transient protection components are essentially eliminated from my detector since, when the high-voltage output 15 is discharged, a feedback pulse is delivered to the converter transformer 18 and eventually to the collectors of transistors Q19 and Q20 which are at the return potential. Hence, the feedback pulse is shortened and dissipated as each transistor now acts as a diode with the feedback pulse going from the transformer primary, to emitter-collector and related circuit thereof. This feature obviates the need for additional surge protection passive elements commonly required with common emitter converter circuits.

STORAGE ELEMENT AND SWITCHING CIRCUIT

Returning now to the further operation of my detector, the rectified voltage from bridge 21 is applied to capacitors 22 and 23 and charges same through the primary windings (40a and 40b) of a pulse transformer 40 (this transformer comprising the high-voltage output 15 mentioned above) and choke 24.

Simultaneously, the battery voltage (from battery 10) is applied both to the base of unijunction transistor Q25 (which forms a portion of a unijunction relaxation oscillator) and to capacitor 26 through resistor 27. The unijunction oscillator is operated by current flow from the 10 volt battery through resistor 28 to charge capacitor 28a. The voltage at the unijunction (Q25) emitter will rise to trigger level depending, in time, upon the adjustable setting on resistor 28. When the trigger level is reached, Q25 fires, discharging capacitor 28a through resistor 30 to the base of transistor Q29.

It should be noted that the voltage divider comprising resistors 30 and 31 biases transistor Q29 just below conduction so that a rapid defined "turn-on" of same is accomplished at the instant that the unijunction oscillator has an output pulse emanating therefrom. This feature "shapes" the relaxation oscillator output and results in a gating pulse output from Q29 that has a uniform and very short rise time (½ nanosecond). As will be seen, these shaped pulses with the fast rise time result in a discharging of capacitors 22 and 23 and in the pulsing of the detector electrode in such a manner that the sensitivity of my detector in substantially enhanced.

In order to positively control the discharging of capacitors 22 and 23 by the shaped output pulse from the relaxation oscillator, an SCR (silicon control rectifier) 32 is located in the discharge circuit. The gating of SCR 32 (which facilitates the discharging of capacitors 22 and 23) is controlled by holding a negative voltage on the gate terminal of the same by, in turn, controlling the voltage on capacitor 26 via the relaxation oscillator circuitry.

More particularly, the plate of capacitor 26 that directly interconnects with the collector of transistor Q29 via line 26a is held at a negative or ground potential when transistor Q29 is on. This feature allows capacitor 26 to be charged through diode 35. When transistor Q29 is turned off (due to the absence of a unijunction pulse on the base thereof), capacitor 26 discharges through diode 33 to the gate terminal of SCR 32 thereby turning on same. In this manner, the normally negative potential of the gate terminal of SCR 32 prevents spurious turn-on by transients yet offers a precise means to positively control the gating on of the SCR when desired. The circuit network comprising capacitors 57 and 58, diode 59 and resistor 60 provides noise immunity and helps eliminate the effect of transients.

Also, diode 33 and resistor 36 help prevent erratic triggering while capacitor 37 eliminates any AC component which may be present. Resistor 34 reverse biases SCR 32 to further assist in preventing the premature turn-on of the SCR in that the negative potential on the gate terminal of SCR 32 (because of the presence of resistor 34) is limited by the normal diode drop. By connecting diode 38 and choke 39 between the discharge capacitors and the SCR, the turn-on characteristics of SCR 32 are additionally refined since choke coil 39 limits the $di/dt$ therethrough to safe values so that thermal runaway of the SCR is prevented.

The proper and controlled gating on of SCR 32 has an additional effect (besides discharging capacitors 22 and 23) in that this condition effectively short circuits transformer 18 as it is reflected through the primary thereof so that the base drive is removed from transistors Q19 and Q20 thereby bringing the converter operation to a halt since it is not needed at this time.

With SCR 32 on, the positive side of capacitors 22 and 23 is connected to the negative side of the two primary windings (40a and 40b) of pulse transformer 40. As a result, two closed parallel circuits are formed, e.g. (1) SCR 32, capacitor 22, choke 24 and pulse transformer primary 40b; (2) SCR 32, capacitor 23 and pulse transformer primary 40a. The voltage in the primary winding 40a rises from zero to 1200 volts (this voltage value is essentially equal to the charge on its associated capacitor) in approximately 0.5 microseconds while the rise time in the primary winding 40b is about 0.9 microseconds (note the presence of choke 24 in the latter circuit). Accordingly, a resonant or tank circuit is formed between the discharge capacitor 22, choke 24 and the primary windings with the same being constructed of selectably sized components to have a low "Q." When the capacitors (22 and 23) discharge, current flows through SCR 32 and the primary windings and will continue to flow until capacitors 22 and 23 are charged in a reverse direction to approximately 1000 volts. At this time, the current flow attempts to reverse through SCR 32 causing same to turn to its normal off condition. The reverse voltage associated therewith now causes diode bridge 21 to assume a short circuit condition, discharging capacitors 22 and 23 to ground from its reversed direction and recharging same towards its normal state. When the current supplied by the inductance of the windings 40a and 40b again drops to zero, the diode bridge 21 returns to its normal state, the load is removed from converter transformer 18 and normal converter action resumes.

In order to insure uniform detector sensitivity, capacitor 26 is completely discharged or drained with each gating of SCR 32. The drain path for capacitor 26 (occurring when the winding connected plates of capacitors 22 and 23 have a potential that is more negative than the potential on the upper plate [as seen in FIG. 2] of capacitor 26) is through diode 41, resistor 42 and winding 40a, also through diode 43, resistor 44, choke 24 and winding 40b. This allows each SCR turn-on pulse to have a substantially identical rise time so that sensitivity variations are minimized. Capacitors 45 and 46 discharge along the respective drain paths mentioned above to effectively lower the voltage at diodes 41 and 43 so that the internal voltage drop through each diode is compensated for during the draining of capacitor 26. Finally, while diode 35 permits capacitor 26 to charge, it also isolates the circuit when the upper plate of the same is positive and SCR 32 is turning on.

To summarize the operation of the converter circuit, the switching circuit and the double primary transformer, it is significant that the output from the exploring electrode can assume values in the range of from 10,000 to 75,000 volts by utilizing all electronic components rather than relying upon component elements with mechanical features. In this regard, the sizes of capacitors 22 and 23 are selected so that capacitor 23 is approximately 1.5 microfarads while capacitor 22 has a capacitance of approximately 3.0 microfarads. With primary winding 40b having and choke 24 in its discharge circuit, capacitor 23 serves to initiate expansion of the magnetic field of the core of transformer 40 by rapid discharge through primary winding 40a. With this circuit arrangement and with the delayed current flow through primary winding 40b, a high-voltage pulse is delivered to the exploring electrode each time SCR 32 is gated on.

Due to the nature of a mastic pipe coating, a minimum of 3200 volts is needed for accurate holiday detection. Thusly, the double primary pulse transformer with its substantially greater voltage output coupled with the fast rise time of the gating pulse significantly increases the efficiency of my detector. Furthermore, the 1.6 kilocycle frequency supplied by the relaxation oscillator circuit including unijunction transistor Q25 allows my detector to operate in the medium frequency range rather than at approximately 30 cycles as in conventional mechanical type detectors. This higher frequency, with the use of electronic components, permits the pulse transformer to deliver detection pulses to exploring electrode 16 at a much faster rate thereby allowing the detector unit to be moved over the pipe surface at a faster speed. Accordingly, the fast rise time as fast as (2 to 3 nanoseconds) of the detection pulses and increased gating frequency allow the detector to find, much more quickly, conductive material lodged in the mastic coating which other detectors may miss.

The alarm circuit utilized with my detector is connected on the ground return side of pulse transformer 40. Each time a holiday is detected, a voltage appears at terminal 16a which causes a current flow through resistor 47 and a special argon lamp 48 to control the illuminating brilliance or lumen output of same. Transistor Q49 is sensitive to photon emissions in the emission range of argon lamp 48 so that when in the conduction state (due to the brilliance of argon lamp 48 turning on Q49) transistor Q50 is driven into conduction. Current then flows in the collector circuit of Q50 through light 51 and alarm 52 thereby giving both an audible and a visual indication of the presence of a holiday. Resistor 53 is used to limit the current on the base of transistor Q50 and is combined with resistor 54 to provide a slight forward bias on transistor Q50.

Capacitor 55 and resistor 56 form a second gating source for SCR 32. Since capacitor 55 always has a charge on it, when the alarm circuit turns on, a slight positive charge flows through resistor 56. This charge has the effect of an AC voltage on one side of capacitor 55, therefore causing a current flow through capacitor 55 and diode 33 to gate on SCR 32. This circuit assures that two holidays, each in close proximity are detected as two individual holidays and not as one.

Is is understood that changes may be made in the details of the construction and arrangement of parts above described within the purview of my invention.

Having thus described the invention, what is claimed as new and desired to be secured by Letters Patent is:

1. A holiday detector capable of detecting and indicating the presence of a holiday in pipe coating, said detector comprising:
   a source of direct electrical potential,
   converter means for stepping up said electrical potential,
   storage capacitor means capable of being charged by said stepped up potential,
   a pulse transformer having a pair of primary windings, a core, and a secondary winding,
   means for discharging said capacitor means through said primary windings and causing the discharge of substantial electrical energy into the respective primary windings to occur in time staggered relationship to produce a fast rise time, high-voltage output pulse across said secondary winding in response to the excitation of both primary windings,
   an exploring electrode connected to said secondary winding, said electrode being operable to apply said high voltage pulse to said pipe coating whereby arcing between the exploring electrode and the pipe is indicative of the presence of a holiday,
   means for controlling said discharging means, the latter including an electrically responsive switching device, said controlling means including an oscillator circuit operable to produce an output signal for gating said device on thereby permitting said capacitor means to discharge, and
   circuit means for shaping said signal applied to said device of said discharging means, said shaping circuit means providing that portion of said signal which gates said device on with a short rise time.

2. The invention as in claim 1 wherein said fast rise time of said output pulse lies in a range of from 2 to 3 nanoseconds.

3. The invention as in claim 1 wherein said device comprises an SCR with said shaping means being operably associated with the gate terminal of said SCR, said shaping means including at least one transistor capable of switching states in accordance with said output signal so that a pulse is produced therefrom having said short rise time, said pulse resulting in said SCR being gated on thereby discharging said capacitor means through said primary windings.

4. The invention as in claim 1 wherein said device comprises an SCR, said controlling means being connected to the gate terminal of said SCR so that said output signal portion with said short rise time gates said SCR on to permit said capacitor means to discharge through said primary windings, said shaping means including a transistor connected intermediate said oscillator and said SCR, and a voltage divider circuit, said voltage divider circuit biasing said transistor slightly below conduction, said signal turning on said transistor thereby producing an output pulse therefrom to gate on said SCR with said pulse having said short rise time.

5. The invention as in claim 1 wherein said device comprises an SCR, there being means for normally maintaining a negative potential on the gate terminal of said SCR, said shaping circuit means being connected to said maintaining means and operable to deliver a shaped pulse with said said short rise time thereto thereby removing said negative potential from said gate terminal and turning on said SCR, said negative potential normally precluding spurious turn on by transient voltage conditions within said detector.

6. The invention as in claim 5 wherein said maintaining means includes a capacitor having its normally negative plate connected to said gate terminal of said SCR, and means for draining said capacitor each time said SCR is gated on.

7. The invention as in claim 1 wherein said converter means includes a pair of transistors having their collectors connected in common, and a converter transformer, said transistors and said transformer being operable to convert the voltage level of said source to a higher voltage for charging said capacitor means, said detector having a housing, said collectors being mounted directly to said housing, said housing providing a heat sink to dissipate the normal transistor operating heat.

8. The invention as in claim 1 wherein said converter means includes a pair of transistors having their collectors connected in common, a converter transformer operably connected with said transistors, said transistors and said transformer being operable to convert the voltage level of said source to a higher voltage for charging said capacitor means, and means for obtaining a feedback pulse in said converter transformer when said voltage output pulse is produced by said pulse transformer, said feedback pulse being delivered to said common collectors thereby shorting and dissipating same.

9. The invention as in claim 1 wherein said storage capacitor means includes a first and second capacitor capable of being charged by said stepped up potential, said device comprising an SCR operable to discharge said capacitors through respective primary windings of said pulse transformer when said SCR is gated on.

10. The invention as in claim 9 wherein said discharging means further includes a means for delaying the discharge of one of said capacitors through the corresponding primary winding.

11. The invention as in claim 9 wherein said first capacitor has substantially one-half the capacitance of said second capacitor, and wherein said discharging means further includes a choke connected intermediate said second capacitor and the corresponding primary winding thereby delaying full energization thereof when said second capacitor is discharged.

12. In a holiday detector:
electrical energy storage means capable of being charged to an energy storing condition by an applied electrical potential;
a transformer having a pair of primary windings coupled with said storage means and a secondary winding presenting a high-voltage output;
an exploring electrode connected with said output for applying the voltage delivered at said output to the coating of a pipe under test; and
control means coupled with said storage means for effecting alternate charging of said storage means by said applied potential and discharging of the stored electrical energy into said primary windings,
said control means causing the discharge of substantial energy into the respective primary windings to occur in time staggered relationship to provide a fast rise time, high-voltage pulse at said output in response to the collapse of both primary fields, whereby arcing between the exploring electrode and the pipe is indicative of the presence of a holiday.

13. The holiday detector as claimed in claim 12, wherein said transformer has a core operably associated with said primary and secondary windings, said substantial energy exciting one of said primary windings ahead of the other primary winding to initiate expansion of the magnetic field of said core.

14. The holiday detector as claimed in claim 12, wherein circuitry is provided establishing a pair of separate discharge paths from said storage means to the respective primary windings, said control means including means in one of said paths for delaying the discharge of said substantial energy into the corresponding primary winding.

15. The holiday detector as claimed in claim 14, wherein said delaying means comprises a choke interposed in series with said one path.

16. The holiday detector as claimed in claim 12, wherein said control means includes electrically responsive switching means and circuitry for cyclically operating said switching means to effect said alternate charging and discharging at a substantially constant frequency, there being means responsive to the detection of a holiday in said coating and coupled with said switching means for operating the latter to cause discharging of said storage means independently of the operation of said circuitry, whereby to permit independent detection of a second, closely adjacent holiday.

17. The holiday detector as claimed in claim 12, wherein is provided a source of direct voltage, and a converter for converting said voltage into a higher, alternating voltage and rectifying the latter, said converter including at least one transistor, a transformer having a primary winding, and a circuit means connected with said transistor and said winding for operating the transistor in alternate conductive and nonconductive states and causing turn-on current for the transistor to flow in said winding to increase the drive applied to the transformer.